July 12, 1949.  J. D. GWYN ET AL  2,476,145
PROTECTION OF SURFACES
Filed Aug. 12, 1944

Inventors
JAMES D. GWYN.
CARL B. WILLIAMS JR.

By Frank Fraser
Attorney

Patented July 12, 1949

2,476,145

UNITED STATES PATENT OFFICE 2,476,145

PROTECTION OF SURFACES

James D. Gwyn and Carl B. Williams, Jr., Toledo, Ohio, assignors to Libbey-Owens-Ford Glass Company, Toledo, Ohio, a corporation of Ohio Application August 12, 1944, Serial No. 549,234

7 Claims. (Cl. 206—62)

This invention relates broadly to the protection of surfaces and more particularly to an improved way of protecting the surfaces of glass bodies that are to be stacked together.

According to the invention the surface of a glass plate, for example, is protected by first giving it an electrostatic charge and then applying a layer of protecting material to the surface. The material will be attracted to the surface as it is applied and will be temporarily retained thereon by the electrostatic charge. In cases where it is desired to keep the protective layer in place for a considerable length of time, the surface of the glass plate that carries the protective material is placed against a second surface. In this way, the material will be retained in position even after the charge is dissipated.

Although the invention lends itself to the protection of many kinds of surfaces, under various conditions, it has proved to be especially useful and valuable in connection with the packaging of glass sheets or plates for shipment.

Heretofore, it has been customary to pack the glass plates by stacking them in wooden boxes with sheets of paper between the plates to separate the adjacent glass surfaces from one another. These paper spacers prevent scratching or marring of the surfaces of the plates, but the paper sheeting is bulky and awkward to handle, presenting a handling problem at the packing end, and both a handling and a cleaning problem at the unpacking end.

Furthermore, under certain conditions, if packaged glass with sheets of paper between the glass plates is stored for any length of time, stain appears on the glass in the area covered by the paper. This stain cannot be removed by any of the usual methods of cleaning, so that even light staining appreciably reduces the market value of the glass, while badly stained glass is not acceptable to the trade at all.

With the present invention any protective material that will be attracted and held by an electrostatic charge can be used, in any convenient form, on or between the surfaces to be protected.

The primary object of the invention is the provision of a new, efficient and economical way of temporarily protecting surfaces.

Another object is to provide a novel method and apparatus for applying a protecting layer to, and for temporarily maintaining it on a surface to be protected.

A further object is the provision of a different kind of surface protecting means which consists of a layer of protective material held on the surface by an electrostatic charge.

Still another object is the provision of an improved method of packaging glass sheets which involves the use of a layer of wood flour or other finely divided or powdered material between adjacent sheets of glass in the package.

Other objects and advantages of the invention will become more apparent during the course of the following description, when taken in connection with the accompanying drawings.

In the drawings, wherein like numerals are employed to designate like parts throughout the same:

Figure 1:
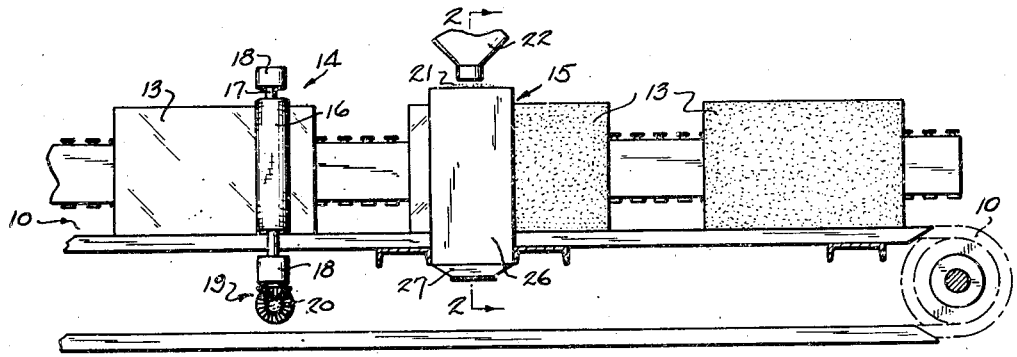
Fig. 1 is a front elevation of a glass conveying means, with one type of charging and dusting apparatus associated therewith.
Figure 2:
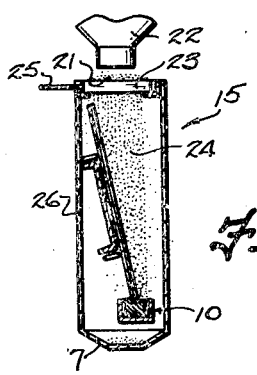
Fig. 2 is a vertical, sectional view taken substantially on the line 2—2 in Fig. 1.
Figure 3:
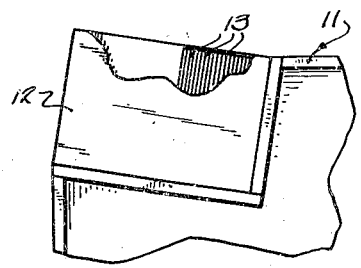
Fig. 3 is a fragmentary view of a packing bench showing a shipping box in the process of being packed with glass sheets.

Referring now more particularly to the drawings, there is illustrated in Figs. 1 and 2 a conveyor 10, of the type that is ordinarily used in carrying sheets of laminated safety glass through the final washing and inspection booth and into packing position. The packing station is at the right hand end of the conveyor shown, and a packing bench 11, such as shown in Fig. 3, is preferably positioned at that point.

It will be noted that this bench 11 is adapted to support a shipping box 12 at such an angle that glass plates 13 can be stacked in the box on end, and will remain in proper position. As already explained, it has heretofore been customary to separate the glass plates sufficiently to prevent scratching or marring of their surfaces by inserting sheets of paper between the plates during packing.

With applicants' invention, however, each glass plate arrives at the packing station with a layer or coating of protecting material already in place on at least one surface. This protective layer is retained in position by an electrostatic charge on the glass so that the packer has only to pick the coated plates from the conveyor and stack them, one against the other in the shipping box. Since there is no separator to insert and position each time a plate is placed in the box, a man can pack more glass, at a faster rate; and, where the protective material is used in finely divided form, the problem of handling piles of paper sheets and subsequently disposing of them is eliminated.

One relatively simple, but effective means of applying a protective layer to glass sheets according to the invention is illustrated in Figs. 1 and 2 wherein the electrifying apparatus is designated in its entirety at 14 and a dusting apparatus at 15. As here shown, the electrifying apparatus comprises a cloth roll 16, preferably of silk, which is adapted to be rapidly rotated in contact with the surface of glass sheets, preferably in a direction opposite to their movement as they travel along the conveyor 10, to give an electrostatic charge to the glass.

For this purpose the roll 16 is arranged parallel to the surfaces, and slightly within the path of the moving sheets, being rotatably supported in this position upon a shaft 17, journaled in suitable bearings 18. The roll 16 can be driven at suitable speeds through the intermediary of bevel gearing 19, from a drive shaft 20, connected to a suitable source of power (not shown).

The conveyor 10 is preferably so positioned that the glass sheets contact the rapidly revolving roll 16 shortly after they have received their final wash and inspection and are ready to be packed for shipment.

The charged glass moves from the charging means, along the conveyor, to the dusting apparatus 15 where the layer of protective material is applied. Dry wood flour of about 100 mesh has been found to be very satisfactory for this purpose. A supply of the flour 21 may be fed downwardly from a suitable hopper or bin 22 into a vibrating pan 23 from the perforated bottom of which the flour is sifted in a stream or cloud 24, into the path of the charged and moving sheets.

The electrostatic charge on the surface of the sheets passing through the atmosphere filled with the wood flour will cause the particles of flour to be attracted to the charged surface and to be deposited thereon in a relatively thin, uniform layer; and the electrostatic charge will retain the coating on the glass for a length of time that is at least sufficient to permit the sheets to arrive at the packing position and to be packed in the box.

The pan 23 may be vibrated or agitated in any suitable manner; for example, by means of a vibrating shaft 25 connected with a vibratory motor. It is also desirable that the wood flour be dusted onto the glass in a substantially closed chamber as at 26, and the chamber may be provided with a hopper bottom 27 to permit ready recovery of the unused wood flour.

When a glass sheet 13 reaches the right hand end of the conveyor 10 it will be provided with a temporary coating of wood flour on one of its faces. Of course both sides of the sheets can be coated if desired, but one side is all that is necessary. The packer takes the coated sheets from the conveyor and stacks them into a box 12, preferably with the coated side of each sheet in contact with the uncoated side of the preceding sheet.

In this way there will be a layer of wood flour between each of the sheets in the box, and the fact that the coated side of each sheet is immediately placed in contact with a second surface will insure the separating layer being held in place even after the electrostatic charge has been dissipated.

In actual practice, it has been found that the layer of wood flour, when applied to the surface immediately after charging, remains on the surface for ten minutes or more, so that there is no lack of time to permit proper packing. However, one of the advantages of this type of protective coating is the fact that after the electrostatic charge has been dissipated, the protective material will drop, or can be readily blown or wiped, off of the glass.

Another advantage lies in the fact that any non-abrasive material that is attracted by an electrostatic charge can be used to form the protective layer. Consequently, a material may be chosen that will not stain or otherwise injure the glass even after a considerable period of storage. In this connection it should also be understood that, in addition to materials in powdered or finely divided form, material in pulp, strip or sheet form can also be used. In the case of strips or sheets of material the protective layers need only be of sufficient area or extent to properly protect or separate the articles. The protective layers can also be built up as strips or partial coatings when powdered material is used, by electrifying only selected and restricted portions of the surface to be protected.

Figures 4, 5:
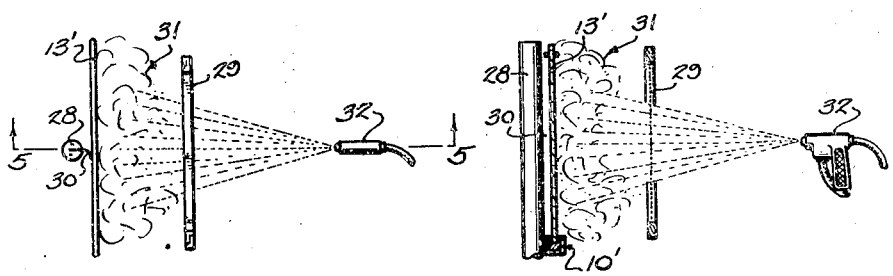
Fig. 4 is a top plan view of another type of charging and dusting apparatus.
Fig. 5 is a vertical section taken substantially along the line 5—5 in Fig. 4.

It is apparent that various means of electrifying the surfaces to be treated as well as numerous ways of supplying the protective material to the surface can be employed. For example, one modified form of charging and dusting apparatus has been illustrated in Figs. 4 and 5 of the drawings.

This differs from the apparatus of Figs. 1 and 2 principally by the facts that the electrostatic charge is set up in a different manner, and that not only is the glass given a positive charge, but the particles of the dusting material are given a negative charge as well.

The particular charging and dusting apparatus is associated with a conveyor 10' in much the same manner as the apparatus of Figs. 1 and 2, but in this case the charging apparatus consists of an insulated electrode 28 at one side of the path of the glass sheets 13' on the conveyor 10', and a second electrode 29 in the form of a wire screen on the opposite side of the path of travel of the glass sheets. The electrode 28 is provided with a series of outwardly extending flexible fingers 30 so positioned to contact the surface of the glass as it travels past the electrode.

As the charged glass moves along and engages the flexible fingers 30 of the electrode 28, a cloud of wood flour 31 is blown through the screen electrode 29 by a spray gun 32 and onto the opposite side of the glass sheet. As the particles of wood flour pass through the screen they are given a negative electrostatic charge, causing their movements to be accelerated as they are first attracted toward, and then held in engagement with, the positively charged surface of the glass.

Each of the two electrodes 28 and 29, representing the positive and negative poles, is connected to a suitable source of high potential current. A unidirectional or half wave rectified alternating current at a potential of around 72,000 volts has given very satisfactory results.

The glass may of course be given a negative charge, and the wood flour particles a positive charge, if desired; and it is to be understood that the forms of the invention herewith shown and described are to be taken as illustrative embodiments only of the same and that various changes in the shape, size and arrangement of parts may be resorted to without departing from the spirit of the invention or the scope of the subjoined claims.

We claim:

1. In a method of packaging or stacking a group of articles, the step of protecting a surface of an article in said group which comprises attracting and temporarily holding a layer of protective material on a surface by electrifying said surface, and then retaining said layer in position by contact with the surface of another article in the group.

2. In a method of packaging or stacking a group of articles, the step of protecting a surface of an article in said group which comprises giving an electrostatic charge to said surface, creating a supply of a material in finely divided form that will be attracted to the surface by the electrostatic charge, bringing said surface and said material into relative position to cause a layer of the material to be deposited and held on the surface, and then placing said coated surface into contact with the surface of another article in the group.

3. In a method of packing glass sheets or plates, the steps of electrifying one surface of a series of glass plates, applying a material that is attracted by the electrification of the glass to said surface, and then stacking successive sheets one against the other with a layer of said material between each adjacent sheet.

4. In a method of packaging glass sheets, the steps of giving one surface of each of a series of glass sheets an electrostatic charge, dusting the charged side of each sheet with a powdered protective material, and then stacking the glass in a package with the uncoated side of each sheet in contact with the coated side of the next succeeding sheet.

5. In a method of packaging glass sheets, the steps of moving a succession of sheets forwardly into position to be packed, passing said sheets into contact with a rapidly rotating silk roll during their forward movement to set up an electrostatic charge on one surface thereof, dusting the charged surface with wood flour, and then stacking successive sheets into a package with a layer of wood flour between each two adjacent sheets.

6. In the art of stacking or packaging glass sheets, a stack of glass sheets, and a separator consisting of a layer of dry, powdered, non-abrasive material that is attracted by an electrostatic charge, between each of the sheets in the stack.

7. In the art of stacking or packaging glass sheets, a stack of glass sheets, and a separator consisting of a layer of dry wood flour between each of said sheets.

JAMES D. GWYN.
CARL B. WILLIAMS, Jr.

REFERENCES CITED

The following references are of record in the file of this patent:

UNITED STATES PATENTS

| Number | Name | Date |
| --- | --- | --- |
| 820,717 | Henke, Jr. | May 15, 1906 |
| 1,293,684 | Brogley | Feb. 11, 1919 |
| 1,698,845 | Gustin | Jan. 15, 1929 |
| 2,027,308 | Schacht | Jan. 7, 1936 |
| 2,128,811 | Foster | Aug. 30, 1938 |
| 2,163,642 | Wallach | June 27, 1939 |
| 2,173,032 | Wintermute | Sept. 12, 1939 |
| 2,174,328 | Meston et al. | Sept. 26, 1939 |
| 2,247,963 | Ransburg et al. | July 1, 1941 |
| 2,285,220 | Morrell | June 2, 1942 |
| 2,320,674 | Swift | June 1, 1943 |